US010743520B2

(12) United States Patent
Van Curen et al.

(10) Patent No.: US 10,743,520 B2
(45) Date of Patent: Aug. 18, 2020

(54) ANIMAL CONTAINMENT SYSTEM CAPABLE OF CONTROLLING PLURALITY OF ANIMALS SIMULTANEOUSLY

(71) Applicant: E-Collar Technologies, Inc., Garrett, IN (US)

(72) Inventors: Greg Van Curen, Fremont, IN (US); Ho-Sung So, Seoul (KR)

(73) Assignee: E-Collar Technologies, Inc, Garrett, IN (US)

( * ) Notice: Subject to any disclaimer, the term of this patent is extended or adjusted under 35 U.S.C. 154(b) by 403 days.

(21) Appl. No.: 15/649,775

(22) Filed: Jul. 14, 2017

(65) Prior Publication Data
US 2018/0228130 A1    Aug. 16, 2018

(30) Foreign Application Priority Data
Feb. 16, 2017  (KR) .......................... 10-2017-0020935

(51) Int. Cl.
*A01K 15/02* (2006.01)
*A01K 15/04* (2006.01)
*A01K 27/00* (2006.01)

(52) U.S. Cl.
CPC ............ *A01K 15/023* (2013.01); *A01K 15/04* (2013.01); *A01K 15/021* (2013.01); *A01K 27/009* (2013.01)

(58) Field of Classification Search
CPC .... A01K 15/023; A01K 15/04; A01K 15/021; A01K 27/009
See application file for complete search history.

(56) References Cited

U.S. PATENT DOCUMENTS

| | | | | |
|---|---|---|---|---|
| 5,870,973 A | * | 2/1999 | Touchton | A01K 15/023 119/720 |
| 6,019,066 A | * | 2/2000 | Taylor | G11B 31/003 119/719 |
| 6,166,643 A | * | 12/2000 | Janning | A01K 15/023 119/721 |
| 6,581,546 B1 | * | 6/2003 | Dalland | A01K 15/023 119/712 |
| 7,081,821 B2 | | 7/2006 | So | |
| 9,861,076 B2 | * | 1/2018 | Rochelle | A01K 15/023 |
| 10,064,391 B1 | * | 9/2018 | Riley | A01K 15/022 |
| 10,084,556 B1 | * | 9/2018 | Young | A01K 15/023 |
| 2003/0121480 A1 | * | 7/2003 | Grimsley | A01K 15/023 119/721 |

(Continued)

FOREIGN PATENT DOCUMENTS

KR    10-2015-0134094 A    12/2015

*Primary Examiner* — Joshua D Huson
(74) *Attorney, Agent, or Firm* — Taylor IP, P.C.

(57) ABSTRACT

A transmitter sends a radio signal defining the boundary of an area, and at least one receiver worn on the animal includes stimulation applying means to apply stimulation to the animal. The receiver senses the radio signal sent from the transmitter and applies stimulation to the animal when the animal is determined to access the boundary of the particular area based on whether the radio signal is sensed or not. The transmitter and the receiver are configured to set a value of at least one of a stimulation intensity, a stimulation type, a stimulation applying mode to apply and an animal size, according to an animal wearing the receiver, via a direct interface between the transmitter and the receiver, not via the radio signal.

9 Claims, 11 Drawing Sheets

(56) References Cited

U.S. PATENT DOCUMENTS

| | | | |
|---|---|---|---|
| 2005/0211187 A1* | 9/2005 | Harman | A01K 15/023 |
| | | | 119/721 |
| 2006/0112901 A1* | 6/2006 | Gomez | A01K 15/023 |
| | | | 119/721 |
| 2008/0168949 A1* | 7/2008 | Belcher | A01K 15/023 |
| | | | 119/721 |
| 2009/0051547 A1* | 2/2009 | McFarland | A01K 15/023 |
| | | | 340/573.3 |
| 2013/0092099 A1* | 4/2013 | Hardi | A01K 15/023 |
| | | | 119/721 |
| 2013/0239905 A1* | 9/2013 | Kim | A01K 15/021 |
| | | | 119/720 |
| 2014/0130751 A1* | 5/2014 | Meikle | A01K 15/023 |
| | | | 119/721 |
| 2014/0320347 A1* | 10/2014 | Rochelle | A01K 15/023 |
| | | | 342/385 |
| 2015/0128878 A1* | 5/2015 | Van Curen | G06K 9/00671 |
| | | | 119/721 |
| 2016/0100552 A1* | 4/2016 | So | A01K 15/021 |
| | | | 119/719 |
| 2016/0366858 A1* | 12/2016 | Seltzer | A01K 27/009 |
| 2017/0094946 A1* | 4/2017 | Giunta | A01K 27/009 |

* cited by examiner

ANIMAL CONTAINMENT SYSTEM CAPABLE OF CONTROLLING PLURALITY OF ANIMALS SIMULTANEOUSLY

TECHNICAL FIELD

The present disclosure relates to a system and method for animal control, and more particularly, to an animal containment system for preventing an animal including pet animals such as dogs or cats or livestock from getting out of a particular area or accessing the particular area.

BACKGROUND

Building a fence in a particular area of farmland to prevent the invasion of animals, particularly wild animals has been widely used for a long time. Furthermore, in certain cases, an electric current of high voltage is allowed to flow in this fence to give electrical shock to wild animals when contacted with the fence in order to keep away the wild animals. However, unintentional electrical shock may be delivered to humans or livestock or pet animals, not wild animals, when contacted with the fence, which is a disadvantage of electric fences.

Patent Literature 1 (U.S. Pat. No. 7,081,821) discloses an electronic fence system and controlling method thereof, in which a fence wire is buried in the ground along a boundary of a confined area restricting an activity area of an animal to radiate a boundary defining radio signal over the air, and when the animal worn with a receiver including stimulation applying means accesses the boundary of the confined area, the receiver receives the boundary defining radio signal of the fence wire and applies stimulation to the animal. Meanwhile, in the system of Patent Literature 1, a mode selection signal for selecting a mode in which stimulation is applied to the animal (a mode in which only electrical shock is applied and a mode in which vibration is applied first and electrical shock follows it) is embedded in the radio signal, and the receiver detects the radio signal and applies stimulation in a mode depending on the mode selection signal embedded in the radio signal.

However, conventional animal containment systems including Patent Literature 1 are basically designed to control only one animal. Of course, the system of Patent Literature 1 may control a plurality of animals using one transmitter (fence wire) if a plurality of animals is worn with each receiver for one transmitter (fence wire). However, in this case, because the radio signal radiated through the fence wire is common to all the receivers, stimulation of the same intensity or the same mode is applied to the plurality of animals which is trained at different levels or has different sensitivities to stimulation.

To solve this problem, for example, optimal stimulation can be applied to each animal by embedding signals of different intensities or different mode selection signals for each of the plurality of animals through time-division modulation of the radio signal. However, in this case, modulation of the radio signal is complex, and when many animals go over the boundary of the confined area very quickly at a point in time, dealing with it is difficult.

RELATED LITERATURES

Patent Literature

Patent Literature 1: U.S. Pat. No. 7,081,821

SUMMARY

In view of the conventional problem, the present disclosure is directed to providing an animal containment system for applying each optimal stimulation to a plurality of animals simultaneously using one transmitter.

To achieve the object, the present disclosure sets a stimulation intensity or a stimulation applying mode that is individually optimized for each animal (receiver) via a direct interface between a transmitter and a receiver, not via a radio signal.

That is, a system according to an aspect of the present disclosure is an animal containment system for preventing an animal managed by a human from accessing a boundary of a particular area in which the animal is not allowed to get out of the area or access the area, and includes a transmitter which is installed on the ground or at a ground structure to send a radio signal defining the boundary of the particular area, and at least one receiver which is worn on the animal and includes stimulation applying means to apply stimulation to the animal, the receiver configured to sense the radio signal sent from the transmitter and apply stimulation to the animal when the animal is determined to access the boundary of the particular area based on whether the radio signal is sensed or not, wherein the transmitter and the receiver are configured to set a value of at least one of a stimulation intensity, a stimulation type, a stimulation applying mode of stimulation to apply and an animal size, according to an animal wearing the receiver, via a direct interface between the transmitter and the receiver, not via the radio signal.

For a plurality of animals, the animal containment system of the present disclosure is configured such that a plurality of receivers is worn on each animal for one transmitter, to control the plurality of animals simultaneously, and individually set a value of at least one of the stimulation intensity, the stimulation type, the stimulation applying mode of the stimulation and the animal size for each of the plurality of receivers.

The direct interface between the transmitter and the receiver may include a primary coil provided in the transmitter and a secondary coil provided in the receiver, and may be formed by placing the transmitter and the receiver such that a primary coil and a secondary coil are close to each other.

Alternatively, the direct interface between the transmitter and the receiver may be formed by establishing a wired connection of the transmitter and the receiver.

According to an embodiment, the transmitter includes a wire buried in the ground along the boundary of the particular area with two ends connected to the transmitter, so that the radio signal is sent from the wire to proximity of the wire, and when the radio signal is sensed with intensity that is higher than or equal to a predetermined intensity, the receiver is configured to determine that the animal accesses the boundary of the particular area and apply stimulation to the animal based on the set value.

Furthermore, according to another embodiment, the transmitter includes an antenna to send the radio signal over the air, and when the radio signal is not sensed with intensity that is higher than or equal to a predetermined intensity, the receiver is configured to determine that the animal accesses the boundary of the particular area and apply stimulation to the animal based on the set value.

Meanwhile, the settable value may include an animal size, and a maximum intensity of stimulation that can be applied to the animal may be determined in proportion to the set animal size.

Furthermore, the stimulation applying mode may include a mode in which only one type of stimulation is applied, and a mode in which one type of stimulation is applied for a predetermined time, and when the animal is still close to the boundary of the particular area even after the predetermined time passed, another type of stimulation is applied.

Furthermore, the receiver may further include an acceleration sensor or a motion sensor, and when acceleration or velocity measured by the acceleration sensor or the motion sensor is higher than or equal to a predetermined reference value, the receiver may be configured to apply a maximum intensity of stimulation to the animal irrespective of the set value.

Advantageous Effects

According to the animal system of the present disclosure, a plurality of animals (collars) can be controlled simultaneously using one transmitter. Particularly, according to the present disclosure, the transmitter only sends a radio signal common to the plurality of receivers (collars), and when there is a need to individually control each animal (collar), an individual control value or code therefor is set by a direct interface between the transmitter and the receiver, so that complex modulation of the radio signal is not needed and it is simple to add receiver(s) which is controlled by one transmitter.

DETAILED DESCRIPTION

Figure 1:
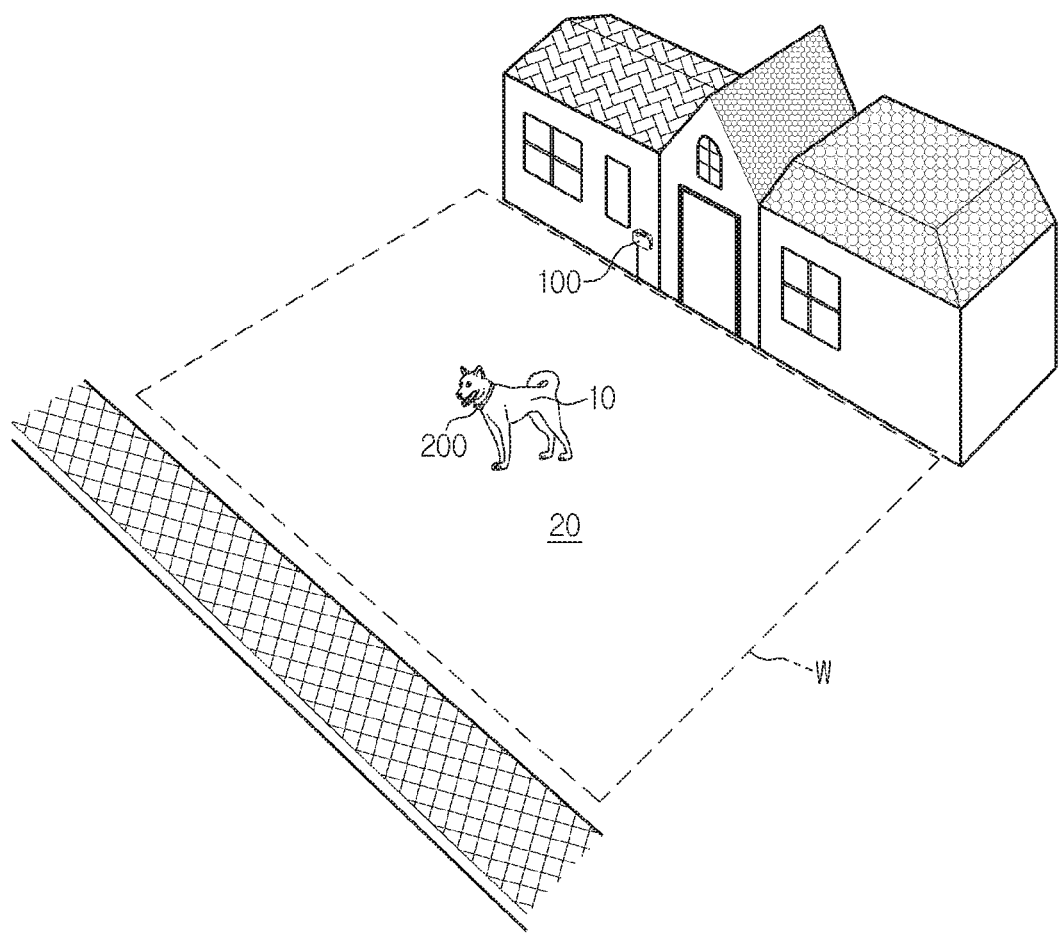
FIG. 1 is a schematic perspective view showing a system constructed according to embodiment 1 of the present disclosure.

Hereinafter, an animal containment system and method according to a preferred embodiment of the present disclosure is described in detail with reference to the accompanying drawings.

Meanwhile, although the following description is provided based on a pet dog typically as an animal that is not allowed to access a particular area or get out of the particular area by the present disclosure, the present disclosure can be applied to any animal if it is animal with a minimum of learning ability managed by humans, for example, various pet animals including pet dogs and livestock.

Furthermore, it should be understood that the terms or words used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Accordingly, the embodiments stated herein and illustrations shown in the drawings are only a preferable example of the present disclosure and do not present all the technical aspects of the present disclosure, so it should be understood that various equivalents and modifications as an alternative thereto could be made at the time the present application was filed.

FIG. 1 is a schematic perspective view showing a system constructed according to embodiment 1 of the present disclosure.

As shown in FIG. 1, the animal containment system (hereinafter, simply referred to as the 'system') according to embodiment 1 of the present disclosure for preventing an animal managed by a human from accessing a boundary (W) of a particular area 20, in which the animal is not allowed to get out of the particular area or access the particular area, includes a transmitter 100 installed on the ground or at a ground structure (typically inside or outside a garage or an entrance of a house) to transmit a radio signal defining the boundary of the particular area, and a receiver 200 worn on the body (for example, neck) of an animal 10 to apply stimulation to the animal when the animal 10 is determined to access the boundary (W) of the particular area. Hereinafter, the receiver 200 is also referred to as a collar.

The transmitter 100 of this embodiment includes a wire W buried in the ground along the boundary of the particular area 20, with the two ends connected to the transmitter 100. The transmitter 100 controls the wire W to send a radio signal having, for example, a frequency of a few kHz to the proximity of the wire W.

Figure 2:
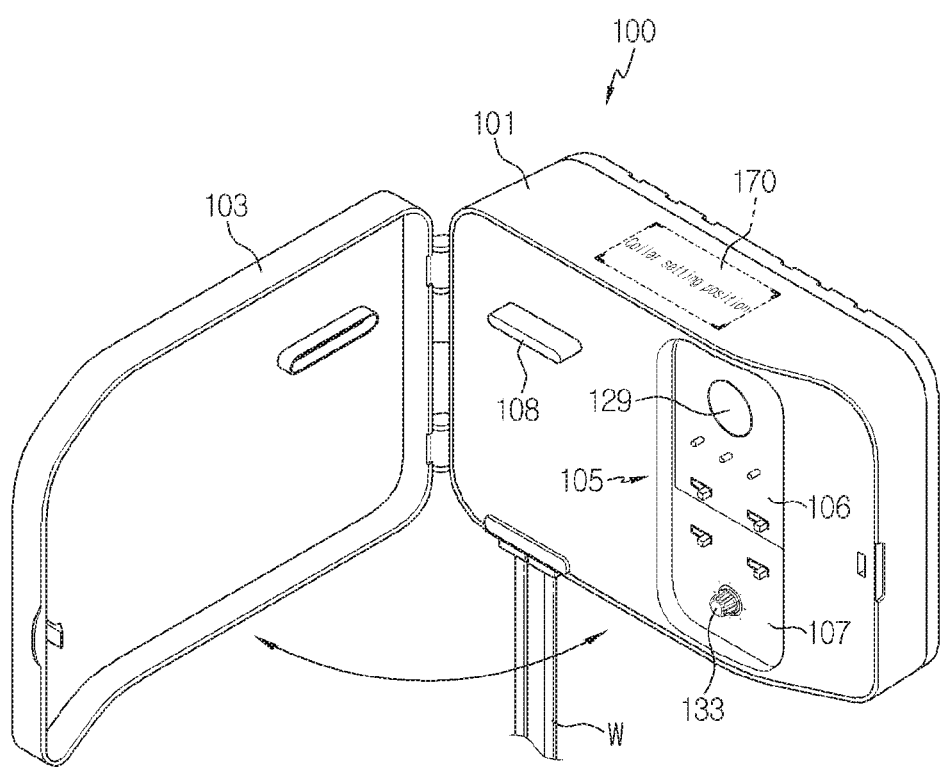
FIG. 2 is a perspective view showing a transmitter in the system shown in FIG. 1.
Figure 3:
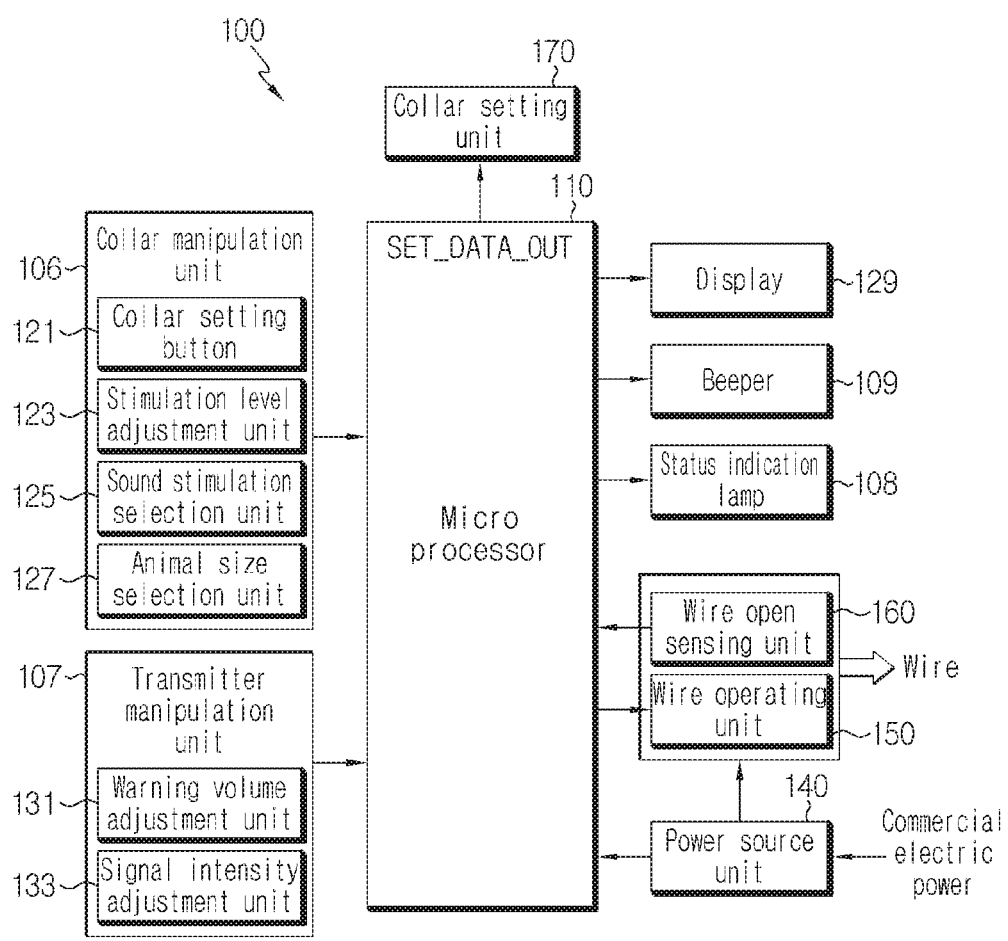
FIG. 3 is a schematic block diagram showing the components of the transmitter shown in FIG. 2.

FIG. 2 is a perspective view showing the transmitter 100 according to this embodiment with a cover 103 open, and FIG. 3 is a schematic block diagram showing the components of the transmitter 100.

A detailed description of the transmitter 100 according to this embodiment with reference to FIGS. 2 and 3 is as follows.

The transmitter 100 has a housing 101 with a structure in which the housing is mounted on the wall of the ground structure, where circuit components that make up the transmitter are embedded in the housing 101, and the cover 103 that is pivotally closed and opened. As shown in FIG. 2, when the cover 103 is open, a manipulation panel 105 is exposed, so that the transmitter 100 and the receiver (collar) 200 can be set or settings can be changed through the manipulation panel 105. The manipulation panel 105 largely includes a collar manipulation unit 106 to set or change various values of the collar 200, and a transmitter manipulation unit 107 to set or change an environment of the system (particularly, the transmitter 100). A detailed structure of the manipulation panel 105 and how to use it will be described below.

Furthermore, a status indication lamp 108 is provided on the front surface of the transmitter 100 to indicate the current status of the system. The status indication lamp 108 is exposed on the front surface of the cover 103 even when the cover 103 is closed, allowing the current status of the system to be seen. The status indication lamp 108 includes, for example, green (or blue) and red color LEDs, to indicate the current status, for example, such as the following:

Green: normal operation

Red: power failure (or lack of backup battery capacity)

Flashing red: wire opened

Furthermore, wire terminals connected to the two ends of the wire W buried in the ground along the boundary of the particular area 20 are provided at the bottom of the transmitter 100, and although not shown in FIG. 2, a connection terminal and/or a USB port is provided to charge or set the receiver 200.

Referring to FIG. 3 showing the functional components of the transmitter 100 by blocks, the transmitter 100 includes the collar manipulation unit 106, the transmitter manipulation unit 107, the status indication lamp 108 as described above, a power source unit 140, a wire operating unit 150, a collar setting unit 170, a beeper 109 to generate a warning sound, and a microprocessor 110 as a control unit to control each of the units.

The power source unit 140 is connected to a commercial alternating current (AC) power source to receive alternating current power of 110V or 220V, and supplies, for example, 5V direct current (DC) power necessary to operate the microprocessor 110 and each circuit component of the transmitter 100, and for example, 24V direct current power necessary to operate the wire. To this end, the power source unit 140 includes a rectifier, a transformer, and a constant voltage circuit. The power source unit 140 may be embedded in the transmitter housing 101, and some or all of the circuit components that make up the power source unit 140 may be realized as an external component such as an adapter (not shown).

Meanwhile, the transmitter 100 may be equipped with a battery (not shown) as a backup power source to prepare for unforeseen incidents such as power failure. In this case, the power source unit 140 further includes a circuit for switching a power supply source to the battery when the supply of commercial alternating current power is cut off. The battery (not shown) may be a primary battery which is not rechargeable, or a secondary battery which can be charged with commercial alternating current power through a charging circuit provided in the power source unit 140.

The wire operating unit 150 is supplied with power from the power source unit 140 under the control of the microprocessor 110, to send a radio signal defining the boundary of the particular area 20 through the wire W.

The radio signal may consist of electromagnetic waves of a predetermined frequency (for example, 8 kHz). In the present disclosure, a signal for individually controlling each collar 200 is not embedded in the radio signal. Accordingly, for the radio signal, electromagnetic waves may be used intactly without separate modulation. To this end, the wire operating unit 150 may include an oscillator, an amplifier, and a necessary filter.

However, to avoid the interference caused by nearby electromagnetic waves, for example, when a next-door house uses the same system, the radio signal preferably includes a minimum signal such as an identification code to allow only the collar 200 having the same identification code to respond to the radio signal. In this case, if one identification code is uniquely assigned to one system (transmitter), this will suffice, and if all the collars 200 included in the system have the same identification code, this will suffice. That is, the system according to the present disclosure includes a plurality of receivers (collars) 200 worn on each animal for one transmitter and can control a plurality of animals simultaneously using one system (transmitter), hence even though the number of collars 200 is multiple, different identification codes are not required for each collar 200.

To embed the identification code in the radio signal, the wire operating unit 150 may further include a modulator. The modulator may employ any of known modulation methods such as AM, FM, CWM, and PWM.

Therefore, according to the present disclosure, because the radio signal does not include a signal for independent control for each collar 200 and includes only one identification code, when the transmitter (wire operating unit) modulates the radio signal, modulation is not complex.

The radio signal defining the boundary of the particular area 20 generated by the wire operating unit 150 is supplied to one end of the wire W, and is sent from the wire W buried along the boundary of the particular area 20 to the proximity of the wire.

On the other hand, the other end of the wire W may be connected to the transmitter 100 through a wire open sensing unit 160. The wire open sensing unit 160 may detect if the wire was cut by measuring the voltage at the other end of the wire W. When a wire open is detected by the wire open sensing unit 160, the microprocessor 110 enables the status indication lamp 108 to indicate the flashing red status as described above, and at the same time, causes warning sound to be generated through the beeper 109.

Furthermore, although not shown, the transmitter 100 may further include an overvoltage protection circuit to prevent the system (transmitter) from being damaged due to excessive voltage applied to the wire W in the case of unforeseen incidents such as lightning. The overvoltage protection circuit may be provided at the other end of the wire W in the same way as the wire open sensing unit 160.

The collar setting unit 170 is configured to set a value of at least one of a stimulation intensity, a stimulation type, a stimulation applying mode of stimulation to apply from each collar 200 to the animal and an animal size to each collar 200 according to a user's input entered through the collar manipulation unit 106, and forms a direct interface between the transmitter and the receiver with a collar setting unit 270 of the receiver (collar) 200 as described below. Details of the collar manipulation unit 106 and the collar setting unit 170 will be described below.

Figure 4:
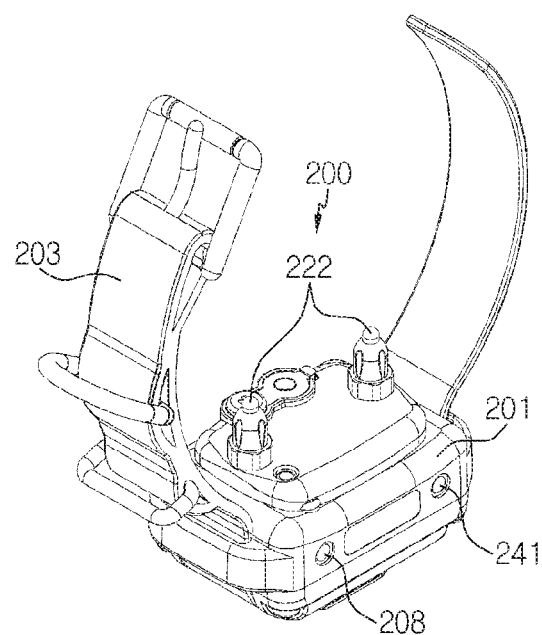
FIG. 4 is a perspective view showing a receiver in the system shown in FIG. 1.
Figure 5:
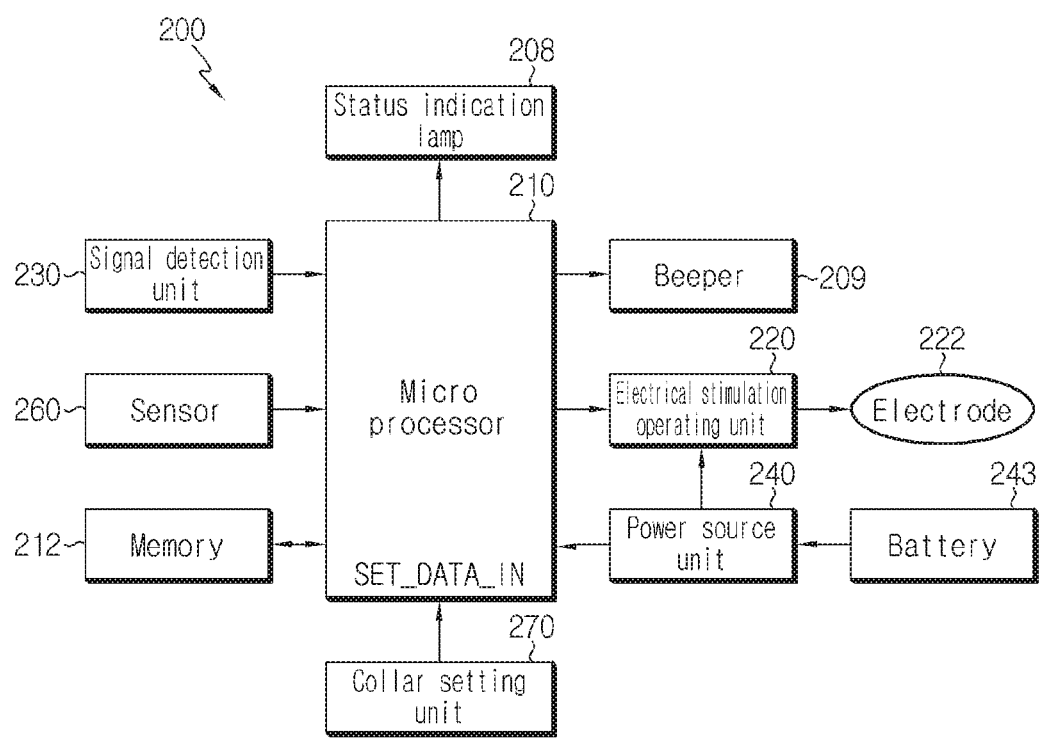
FIG. 5 is a schematic block diagram showing the components of the receiver shown in FIG. 4.

FIG. 4 is a perspective view showing the receiver (collar) 200 according to this embodiment, and FIG. 5 is a schematic block diagram showing the components of the collar 200.

Below is a detailed description of the receiver (collar) 200 according to this embodiment by referring to FIGS. 4 and 5.

The collar 200 is worn on the body (typically around the neck) of the animal 10 by supporting means such as a belt 203 as shown in FIG. 4, and includes a housing 201 to receive the circuit components that make up the collar 200, and an electrode 222 serving as electrical stimulation applying means that protrudes from a part touching the body of the animal 10 (the upper surface in FIG. 4) outside the housing 201. Furthermore, the collar 200 includes a power switch 241, and to prevent a malfunction caused by an unintentional contact with an object, the power switch 241 is designed to power ON/OFF when pressed for a predetermined time (for example, 1 second) or longer.

Furthermore, the collar 200 includes a status indication lamp 208 to indicate of the current status of the collar. The status indication lamp 208 includes, for example, green (or blue) and red color LEDs, to indicate the current status, for example, such as the following:

Green: normal operation

Red: stimulation applied

Flashing red: lack of battery capacity

Referring to FIG. 5 showing the functional components of the collar 200 by blocks, the collar 200 includes the status indication lamp 208 as described above, a power source unit 240 and a battery 243, stimulation applying means 220, 222, 209, a signal detection unit 230, a sensor 260, a collar setting unit 270, a memory 212, and a microprocessor 210 as a control unit to control each of the units.

The power source unit 240 is supplied with power from a battery 243 embedded therein, and supplies, for example, 5V direct current power necessary to operate the microprocessor 210 and each circuit component of the transmitter 100, and direct current power necessary for the electrical stimulation operating unit 220.

For the battery 243, primary batteries may be used, but it is preferred to use rechargeable secondary batteries. The battery 243 may be charged through a commercial alternating current power source using a separate component or a charging adapter (not shown), or the charging terminal or USB port (not shown) of the transmitter 100. Furthermore, the collar 200 has the status indication lamp 208 or a separate display to indicate the remaining amount of the battery 243, allowing the user to replace or charge the battery 243 at a proper time.

The stimulation applying means is designed to apply a proper stimulation to the animal 10 when the animal 10 accesses the boundary of the particular area 20, and the stimulation applying means is not limited to a particular type if it can transmit a warning message to the animal, and typically may use at least one of sound, vibration, and electrical shock stimulation. This embodiment includes the beeper 209 to apply sound stimulation, the electrical stimulation operating unit 220 to generate an electrical pulse of low current high voltage (for example, 50 VAC to 10,000 VAC), and the electrode 222 to apply the generated electrical pulse to the animal 10. The electrical stimulation operating unit 220 typically includes a transformer to receive low voltage power from the battery 243 and convert it to high voltage pulse.

By providing multiple stimulation types, different types of stimulation may be applied to the animal 10 based on how close the animal 10 is the boundary of the particular area 20 or how many the animal 10 accesses the boundary of the particular area 20.

Meanwhile, independent of multiple or single type of stimulation applying means provided, the intensity of stimulation applied by each stimulation applying means, in particular, the electrical stimulation applying means can be preferably adjusted by the microprocessor 210. By doing so, especially in the case of a single type of stimulation applying means, stimulation of different intensities may be applied based on how close the animal 10 is the boundary of the particular area 20. Furthermore, because the intensity of stimulation applied can be adjusted, as the animal 10 accesses the boundary of the particular area more frequently, or when the animal 10 does not move away from the boundary of the particular area 20 in spite of a predetermined intensity of stimulation, stimulation of gradually increasing levels may be applied. However, if the animal does not move away from the boundary of the particular area 20 despite a maximum intensity of stimulation applied for a predetermined time (for example, 10 seconds) or longer, it is desirable to stop to apply stimulation in order to protect the animal.

Though adjustment of the intensity of stimulation to be applied changes depending on the type of stimulation applying means, the intensity of stimulation can be adjusted typically by increasing or decreasing the time during which stimulation is applied, or in the case of sound stimulation (the beeper), by adjusting the intensity or frequency of warning sound, in the case of vibration stimulation (the vibration motor), by adjusting the intensity or frequency of vibration, and in the case of electrical shock stimulation, by adjusting amplitude (voltage), a pulse width, or a duty ratio of an electrical pulse.

The signal detection unit 230 detects the radio signal sent from the wire W and inputs it to the microprocessor 210. To this end, the signal detection unit 230 includes a coil to receive the radio signal, and the coil receives the radio signal when the animal 10 accesses the wire W within a predetermined distance, namely, the coil receives the radio signal using electromagnetic induction by a predetermined intensity or higher of radio signal. Furthermore, as described above, the radio signal sent from the wire W may be modulated, with a minimal signal such as an identification code embedded therein. Accordingly, the signal detection unit 230 may include a demodulation circuit that performs demodulation by the same method as the modulation method employed by the transmitter 100, and may include a necessary circuit, for example, an amplifier or a filter. Further, the signal detection unit 230 may be configured to detect the intensity of the radio signal to detect how close (distance) to the wire W the animal 10 is. In this case, according to the extent to which the animal 10 accesses the wire W, warning stimulation by sound or vibration stimulation as described above and electrical stimulation may be applied in a sequential order, or with varying stimulation intensities.

Meanwhile, as described above, the system of the present disclosure can apply different stimulation intensities, stimulation types, and stimulation applying modes according to the animal 10 wearing the collar 200, and the values for individually controlling the collar 200 are set via a direct interface formed between the transmitter 100 and the receiver (collar) 200, not via the radio signal sent from the wire W. To this end, the collar 200 has the collar setting unit 270 corresponding to the collar setting unit 170 of the transmitter. The details of each collar setting unit 170, 270 of the transmitter 100 and the collar 200 and the setting method are provided below.

Meanwhile, the collar 200 preferably includes an acceleration sensor or motion sensor 260 to sense a motion of the animal 10. With the sensor 260, a power saving function of the collar 200 and a function to prevent the animal 10 from passing through the boundary are provided. That is, when there is no motion of the animal 10 sensed by the sensor 260 for a predetermined time or longer, the animal 10 is determined to sleep or take a rest and the collar 200 is switched to a sleeping mode to minimize power consumption of the collar 200. Furthermore, when acceleration or velocity measured by the sensor 260 is a predetermined reference value or higher, the animal 10 is determined to cross the wire W at a high speed, and a maximum intensity of electrical stimulation is immediately applied to the animal 10 irrespective of the currently set stimulation intensity, stimulation type, and stimulation applying mode.

Subsequently, referring to FIGS. 6 to 9, a process of setting values necessary for individually controlling each collar 200 via a direct interface between the transmitter 100 and the receiver (collar) 200 in the system according to the present disclosure, and the details of each collar setting unit 170, 270 therefor are described.

In this embodiment, values that can be set to individually control for each collar 200 are as follows, but the settable values may be changed.

First, an initial intensity (stimulation level) of an electrical stimulation to apply when the animal 10 accesses the wire W, Second, a stimulation applying mode for selecting whether to apply an electrical stimulation after applying a sound stimulation (warning stimulation) for a predetermined time (for example, 2 seconds) or to apply an electrical stimulation immediately without a sound stimulation, Third, an animal size varying a maximum intensity of an electrical stimulation to apply to an animal and an interval between each level based on a selected animal size.

Figure 7:
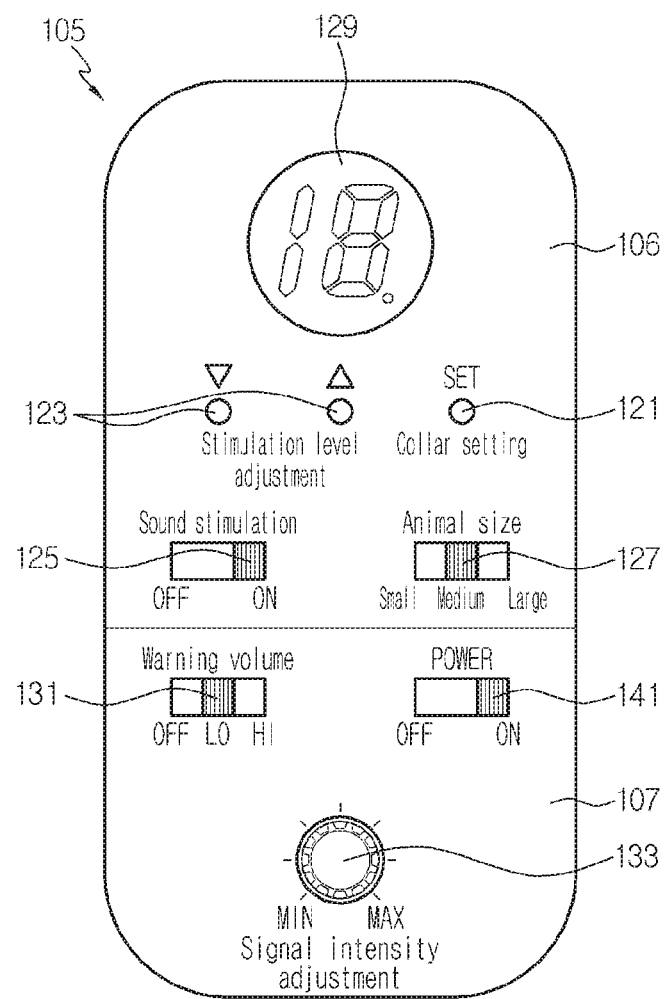
FIG. 7 is a detailed plane view showing a manipulation panel of the transmitter shown in FIG. 2.

To this end, the manipulation panel 105 of the transmitter 100 has the collar manipulation unit 106 as shown in FIG. 7. That is, the collar manipulation unit 106 of the transmitter 100 has a stimulation level adjustment unit 123 to an initial intensity (stimulation level) of an electrical stimulation to apply when the animal 10 accesses the wire W, a sound stimulation selection unit 125 to select the presence or absence of a sound stimulation (warning stimulation), and an animal size selection unit 127. The stimulation level adjustment unit 123 may be realized as each press button together with indication of up/down arrow, the sound stimulation selection unit 125 may be realized as a slide switch for turning sound stimulation ON/OFF, and the animal size selection unit 127 may be realized as a slide switch for selecting the animal size, for example, large/medium/small.

Furthermore, the collar manipulation unit 106 is equipped with a display 129 on which the numbers of 0~19 can be displayed, to display a level value of electrical stimulation adjusted by the user through the stimulation level adjustment unit 123 on the display 129.

Furthermore, the collar manipulation unit 106 has a collar setting button 121 to allow the user to give an execution command after completing the selection (adjustment) of values to set through the stimulation level adjustment unit 123, the sound stimulation selection unit 125, and the animal size selection unit 127.

Figure 8:
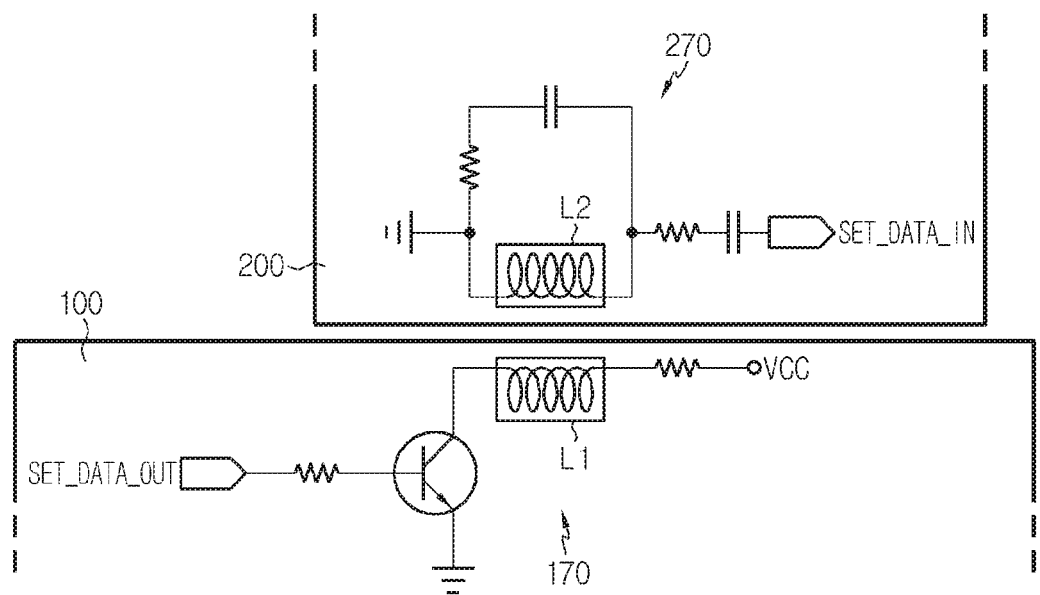
FIG. 8 is a schematic circuit diagram showing an example of a direct interface between the transmitter and the receiver in the system shown in FIG. 1.

Meanwhile, an example of the direct interface between the transmitter 100 and the receiver (collar) 200 of this embodiment is, as shown in FIG. 8, an electromagnetic induction circuit which includes a primary coil L1 provided in the transmitter 100 and a secondary coil L2 provided in the collar 200 and is formed by placing the transmitter 100 and the collar 200 such that the primary coil L1 and the secondary coil L2 are close to each other.

By placement close to each other, the collar setting unit 170 of the transmitter 100 and the collar setting unit 270 of the collar 200 that make up the electromagnetic induction circuit, in particular, the primary coil L1 and the secondary coil L2 are placed on the very inner side of one surface of each housing 101, 201 facing each other, and guiding means (indication of 'collar setting position') is provided on the outer surface of one surface of the transmitter housing 101 (upper surface in FIG. 2) to guide the position at which the collar 200 will be mounted such that the primary coil L1 and the secondary coil L2 face each other. Furthermore, although not shown, guiding means may be provided on the outer surface of one surface of the collar housing 201 (bottom surface in FIG. 4) to guide a mounting direction of the collar 200.

Below is a process of setting values for individually controlling each collar 200 using the transmitter 100 and the receiver (collar) 200 of this embodiment configured as described above.

Figure 6:
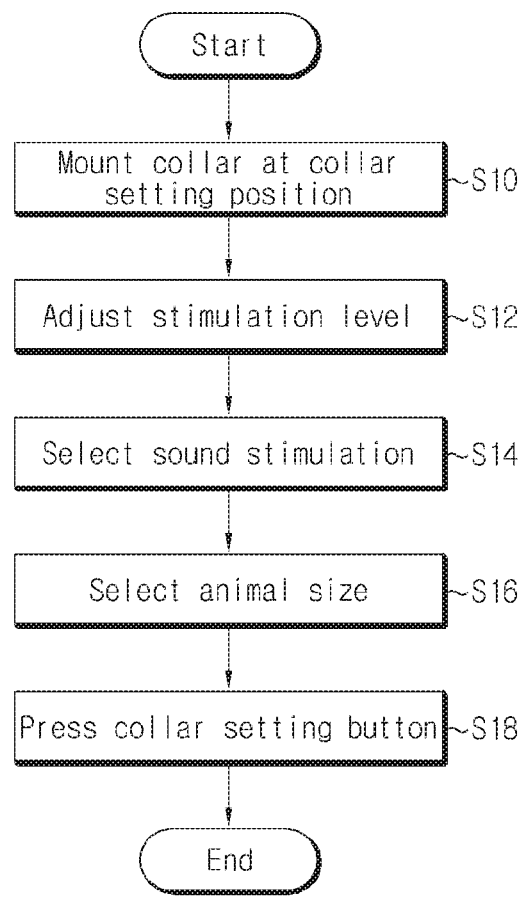
FIG. 6 is a flowchart showing an initial value setting process of the receiver in the system shown in FIG. 1.

First, the user mounts the target collar 200 at a collar setting position on the upper surface of the transmitter 100 (S10 in FIG. 6).

Subsequently, the user sets initial intensity (stimulation level) of electrical stimulation for the collar 200 mounted at the collar setting position, using the stimulation level adjustment unit 123 and the display 129 (S12 in FIG. 6).

Furthermore, the user may select ON/OFF of sound stimulation (warning stimulation), using the sound stimulation selection unit 125 (S14 in FIG. 6).

Figure 9:
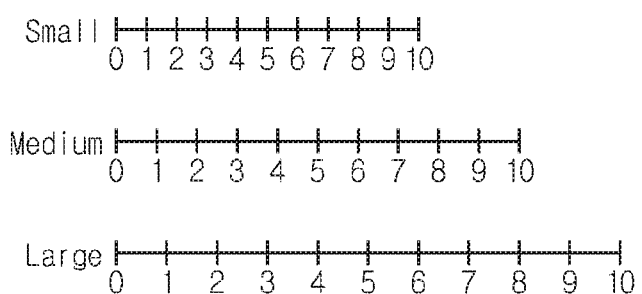
FIG. 9 is a graph showing relative stimulation intensity vs animal size in the initial value setting process of the receiver in the system shown in FIG. 1.

Furthermore, the user may select the size of the animal to wear the collar 200, using the animal size selection unit 127 (S16 in FIG. 6). In this embodiment, the animal may be set in three sizes, large, medium and small, and the maximum intensity of stimulation that can be applied to the animal is differently determined in proportion to the set animal size. That is, as shown in FIG. 9, when the animal size is selected as 'large', the maximum voltage value of electrical stimulation the collar 200 can apply is level 10, and the voltage values divided into 10 are each assigned to levels 1 to 10. Furthermore, when the animal size is selected as 'medium', the voltage value corresponding to level 8, for example, in the case that the size is 'large' is assigned to the maximum voltage value of electrical stimulation that can be applied to animals whose size is 'medium', i.e., level 10, and in the same way, the voltage values divided into 10 are each assigned to levels 1 to 10. Furthermore, when the animal size is selected as 'small', the voltage value corresponding to level 6, for example, in the case that the size is 'large' is assigned to the maximum voltage value of electrical stimulation that can be applied to animals whose size is 'small', i.e., level 10, and in the same way, the voltage values divided into 10 are each assigned to levels 1 to 10.

As described above, according to this embodiment, even though the level is seemingly identical, the voltage value of electrical stimulation really applied may be differently set according to the animal size (strictly, sensitivity of the animal to electrical stimulation).

Meanwhile, although FIG. 6 shows stimulation level adjustment (S12), sound stimulation selection (S14) and animal size selection (S16) in a sequential order, the three steps (S12, S14, S16) may be positioned between steps S10 and S18 in any order.

When selection (adjustment) of the stimulation intensity, the stimulation applying mode and the animal size for the corresponding collar 200 is finished as described above, the user presses the collar setting button 121 (S18 in FIG. 6). Then, the microprocessor 110 of the transmitter 100 generates a code corresponding to the value selected (adjusted) by the user and outputs the code to SET_DATA_OUT pin. Then, based on the code value, a primary side current flows in the primary coil (L1) of the transmitter side collar setting unit 170, and a secondary side current is induced to the secondary coil (L2) of the receiver side collar setting unit 270, is inputted to SET_DATA_IN pin of the microprocessor 210 of the receiver 200, and is stored in the memory 212 of the receiver (collar) 200.

On the other hand, in addition to the electromagnetic induction method, the direct interface between the transmitter 100 and the receiver 200 may be implemented by a wired connection such as a USB port.

On the other hand, the bottom of the manipulation panel 105 of the transmitter 100 is the transmitter manipulation unit 107, and is a manipulator for environment settings of the transmitter or the entire system irrespective of each collar 200. The transmitter manipulation unit 107 includes a warning volume adjustment unit 131, a power switch 141 and a signal intensity adjustment unit 133.

When malfunction occurs in the system, for example, when a wire open in the wire W is detected, power failure occurs, and the backup battery lacks capacity, a warning sound is generated through the beeper 109 to notify the user of the malfunction situation, and the warning volume adjustment unit 131 is a switch for turning the warning sound OFF or adjusting the volume. The power switch 141 is a switch for turning the transmitter 100 ON/OFF.

Furthermore, the signal intensity adjustment unit 133 is a switch for adjusting the intensity of the radio signal to be sent through the wire W, and with the increasing signal intensity, the voltage value of the radio signal that is sent from the wire W increases and the distance the collar 200 can sense the radio signal increases. That is, the access distance to the wire W that causes stimulation to be applied to the animal 10 can be adjusted through the signal intensity adjustment unit 133.

Meanwhile, the display 129 of the collar manipulation unit 106 displays the stimulation level value being currently set when adjusting the stimulation level as described above, and may be used to indicate the current status of the system, similar to the status indication lamp 108. That is, for example, the display 129 may display a flashing dot in the case of normal operation of the system, flashing '-' in the case of a wire open in the wire W, flashing 'P' in the case of power failure, and flashing 'b' in the case of a lack of the backup battery capacity.

Figure 10:
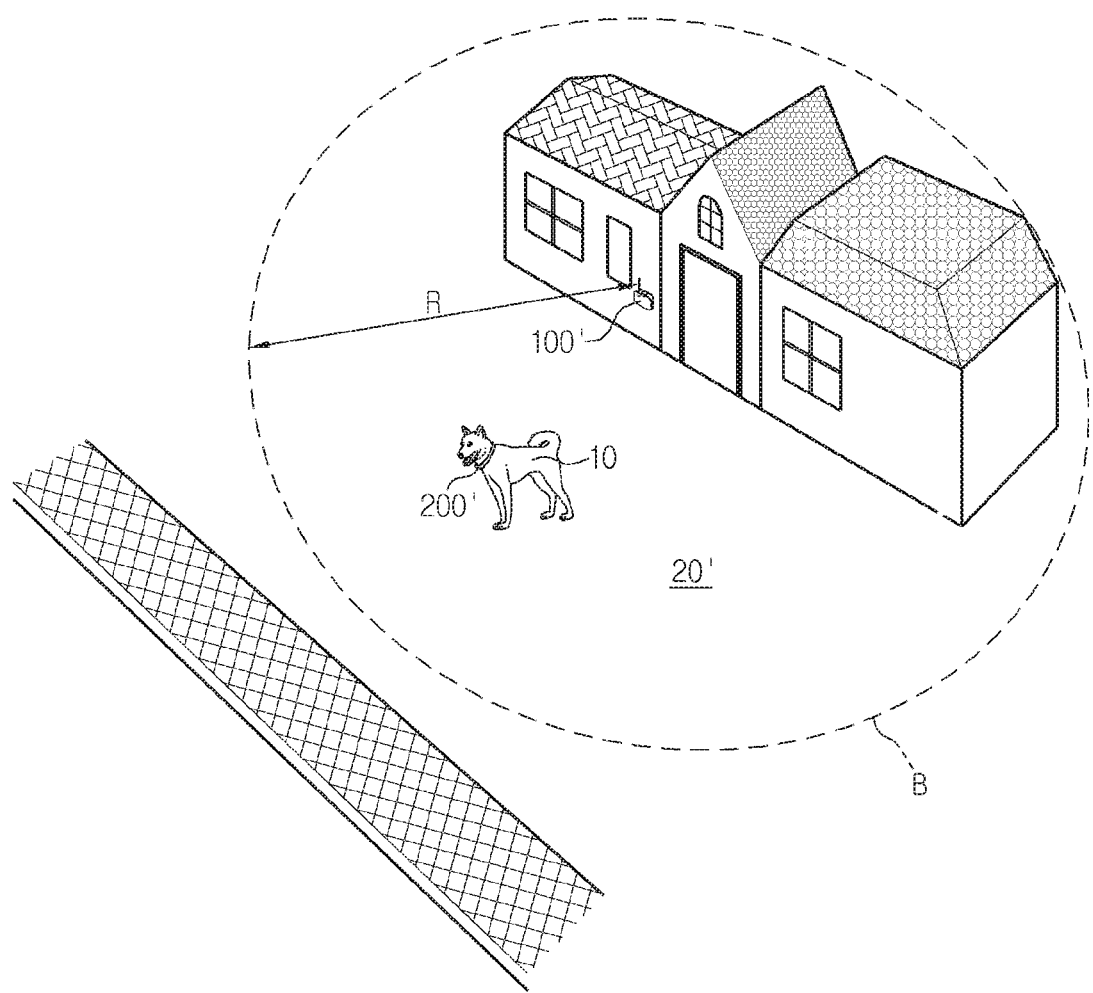
FIG. 10 is a schematic perspective view showing a system constructed according to embodiment 2 of the present disclosure.
Figure 11:
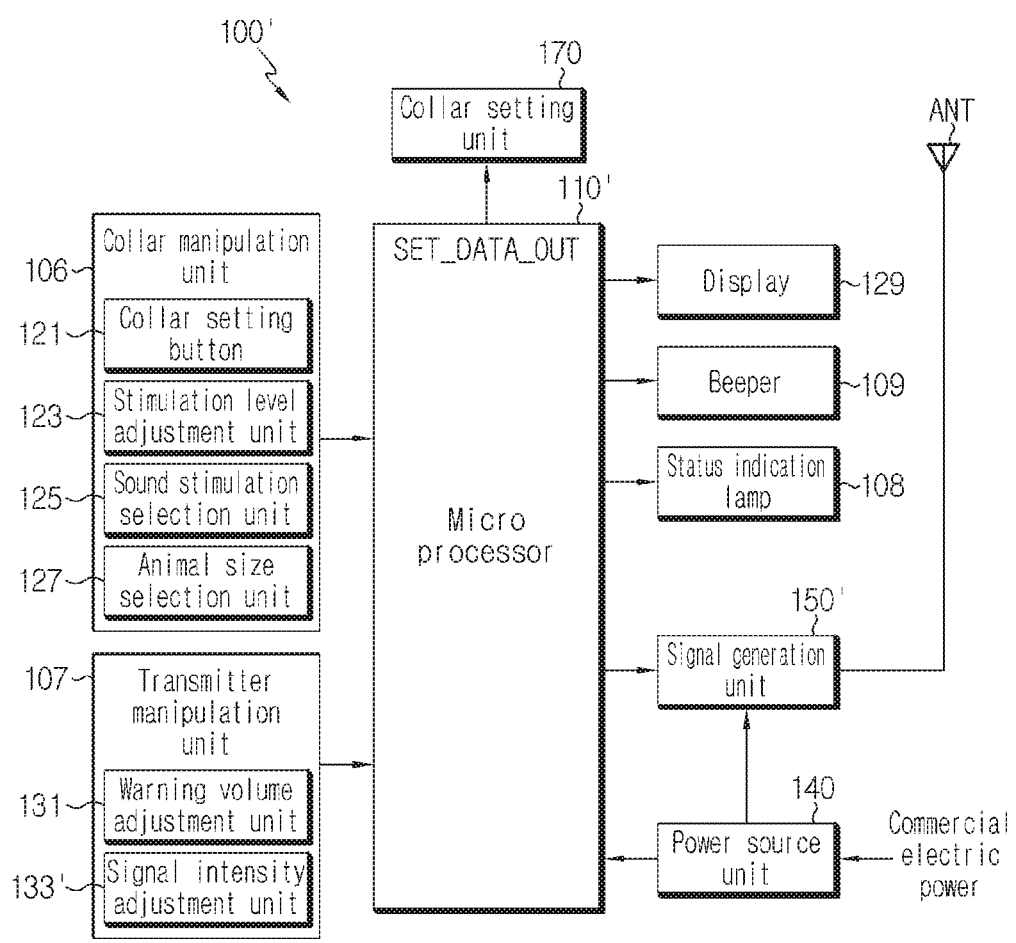
FIG. 11 is a schematic block diagram showing the components of a transmitter shown in FIG. 10.

FIG. 10 is a schematic perspective view showing a system constructed according to embodiment 2 of the present disclosure, and FIG. 11 is a schematic block diagram showing the components of a transmitter according to this embodiment 2.

The system according to embodiment 2 is different from the system of embodiment 1 in a method of sending the radio signal defining the boundary of the particular area. Hereinafter, the system of embodiment 2 is described, focusing on a difference from the system of embodiment 1, with reference to FIGS. 10 and 11.

The system according to this embodiment does not use the wire W of embodiment 1 as means for sending the radio signal, and directly sends electromagnetic waves of a predetermined frequency from an antenna (ANT) of a transmitter 100' over the air. Accordingly, the radio signal sent from the antenna (ANT) is gradually attenuated with the increasing distance from the antenna (ANT), and defines a boundary (B) of a particular area 20' having a radius R. A receiver (collar) 200' determines that the animal 10 accesses the boundary (B) of the particular area 20' when the intensity of the radio signal sensed reduces down to a predetermined intensity or lower, and enables stimulation applying means to apply simulation to the animal 10.

To this end, the transmitter 100' of this embodiment has a signal generation unit 150' instead of the wire operating unit 150 of embodiment 1. The signal generation unit 150' includes an oscillator to generate a carrier wave of a predetermined frequency, a modulator to embed an identification code of the system in the carrier wave, and necessary amplifier and filter, similar to the wire operating unit 150 of embodiment 1. However, as the transmitter 100' of this embodiment does not use the wire W, it does not include the wire open sensing unit 160 of embodiment 1. Furthermore, a signal intensity adjustment unit 133' of the transmitter 100' of this embodiment adjusts the intensity of the radio signal in the same way as the signal intensity adjustment unit 133 of embodiment 1, but the signal intensity adjustment unit 133' only adjusts the boundary (B) of the particular area 20', namely, the radius R, and does not adjust the access distance to the boundary (B) that leads the receiver 200' to apply stimulation to the animal 10, namely, signal reception sensitivity of the receiver 200'.

Furthermore, in this embodiment, the receiver (collar) 200' has a signal detection unit for sensing the radio signal sent from the antenna (ANT), but the signal detection unit of this embodiment is different from the signal detection unit 230 of embodiment 1 in that the signal detection unit 230 of embodiment 1 senses a signal to operate (apply stimulation) when it senses a radio signal of a predetermined intensity or higher, while the signal detection unit of this embodiment senses a signal to operate when it senses a radio signal of a predetermined intensity or lower.

The remaining components of the transmitter 100' and the receiver 200' of this embodiment are identical to the components of the transmitter 100 and the receiver 200 of embodiment 1 including the collar setting unit 170, 270 of embodiment 1.

As described above, according to the system of the present disclosure, it is possible to control a plurality of animals (collars) using one transmitter 100, 100', and in this instance, the transmitter 100, 100' sends a radio signal common to the plurality of receivers (collars) 200, and when it is necessary to individually control each animal (collar), individual control values or codes therefor are set by a direct interface between the transmitter and the receiver, so there is no need for complex modulation of the radio signal and it is simple to add receiver(s) controlled by one transmitter.

While the present disclosure has been hereinabove described with regard to a limited number of embodiments and drawings, the present disclosure is not limited thereto and it is obvious that various modifications and changes can be made thereto by persons having ordinary skill in the technical field to which the present disclosure belongs without departing from the technical aspects of the present disclosure and the appended claims and their equivalents.

For example, the components illustrated and described as functional blocks of the transmitter 100, 100' and the receiver 200, 200' in the embodiments are distinguished in functional aspect and are not mechanically distinguished, and two or more elements may be realized as one circuit component, and on the contrary, an element may be mechanically realized as two or more components.

What is claimed is:

1. An animal containment system for preventing an animal managed by a human from accessing a boundary of a particular area in which the animal is not allowed to get out of the area or access the area, the animal containment system comprising:
   a transmitter which is installed on the ground or at a ground structure to send a radio signal defining the boundary of the particular area; and
   at least one receiver which is worn on the animal and includes stimulation applying means to apply stimulation to the animal, the receiver configured to sense the radio signal sent from the transmitter and apply stimulation to the animal when the animal is determined to access the boundary of the particular area based on whether the radio signal is sensed or not,
   wherein the transmitter and the receiver are configured to set a value of at least one of a stimulation intensity, a stimulation type, a stimulation applying mode of stimulation to apply and an animal size, according to an animal wearing the receiver, via a direct interface between the transmitter and the receiver, not via the radio signal, wherein the transmitter includes a wire buried in the ground along the boundary of the particular area with two ends connected to the transmitter, so that the radio signal is sent from the wire to proximity of the wire, the transmitter having a housing with a manipulation panel, the manipulation panel including a collar manipulation unit and a transmitter manipulation unit, the collar manipulation unit being used to set or change the values of the system, the transmitter manipulation unit being configured to set or change an environment of the system, and when the radio signal is sensed with intensity that is higher than or equal to a predetermined intensity, the receiver determines that the animal accesses the boundary of the particular area, and applies stimulation to the animal based on the set value.

2. The animal containment system according to claim 1, wherein for a plurality of animals, the animal containment system is configured such that a plurality of receivers is worn on each animal for one transmitter, to control the plurality of animals simultaneously, and individually set a value of at least one of the stimulation intensity, the stimulation type, the stimulation applying mode of the stimulation and the animal size for each of the plurality of receivers.

3. The animal containment system according to claim 1, wherein the direct interface between the transmitter and the receiver includes a primary coil provided in the transmitter and a secondary coil provided in the receiver, and is formed by placing the transmitter and the receiver such that the primary coil and the secondary coil are close to each other.

4. The animal containment system according to claim 3, wherein the primary coil is placed on a very inner side of one surface of a housing of the transmitter, the secondary coil is placed on a very inner side of one surface of a housing of the receiver, and guiding means is provided on an outer surface of one surface of the housing of the transmitter to guide a position for mounting such that the secondary coil of the receiver surfaces the primary coil of the transmitter.

5. The animal containment system according to claim 1, wherein the direct interface between the transmitter and the receiver is formed by establishing a wired connection of the transmitter and the receiver.

6. The animal containment system to claim 1, wherein the transmitter includes an antenna to send the radio signal over the air, and when the radio signal is not sensed with intensity that is higher than or equal to a predetermined intensity, the receiver determines that the animal accesses the boundary of the particular area, and applies stimulation to the animal based on the set value.

7. The animal containment system according to claim 1, wherein the settable value includes an animal size, and a maximum intensity of stimulation that can be applied to the animal is determined in proportion to the set animal size.

8. The animal containment system according to claim 1, wherein the stimulation applying mode includes a mode in which only one type of stimulation is applied, and a mode in which one type of stimulation is applied for a predetermined time, and when the animal is still close to the boundary of the particular area even after the predetermined time passed, another type of stimulation is applied.

9. The animal containment system according to claim 1, wherein the receiver further includes an acceleration sensor or a motion sensor, and when acceleration or velocity measured by the acceleration sensor or the motion sensor is higher than or equal to a predetermined reference value, the receiver is configured to apply a maximum intensity of stimulation to the animal irrespective of the set value.

* * * * *